(12) United States Patent
Borrelli et al.

(10) Patent No.: US 6,298,691 B1
(45) Date of Patent: Oct. 9, 2001

(54) METHOD OF MAKING GLASS HAVING POLARIZING AND NON-POLARIZING REGIONS

(75) Inventors: Nicholas F. Borrelli, Elmira; Dennis W. Smith, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/403,712

(22) PCT Filed: Apr. 16, 1998

(86) PCT No.: PCT/US98/07570

§ 371 Date: Oct. 21, 1999

§ 102(e) Date: Oct. 21, 1999

(87) PCT Pub. No.: WO98/47832

PCT Pub. Date: Oct. 29, 1998

Related U.S. Application Data
(60) Provisional application No. 60/044,790, filed on Apr. 24, 1997.

(51) Int. Cl.[7] .......................... C03C 15/00; C03B 27/012; C03B 32/00; C03B 37/00
(52) U.S. Cl. ........................ 65/30.1; 65/30.11; 65/30.13; 65/32.3; 65/33.2
(58) Field of Search ................................. 65/30.1, 30.11, 65/30.13, 32.3, 33.2

(56) References Cited

U.S. PATENT DOCUMENTS

| | | | |
|---|---|---|---|
| 3,325,299 | 6/1967 | Araujo | 106/52 |
| 3,540,793 | 11/1970 | Araujo et al. | 350/147 |
| 3,653,863 | 4/1972 | Araujo et al. | 65/30 |
| 3,954,485 | 5/1976 | Seward, III et al. | 106/47 |
| 4,057,408 | 11/1977 | Pierson et al. | 65/18 |
| 4,086,089 | 4/1978 | Seward, III et al. | 96/27 |
| 4,092,139 | 5/1978 | Ference | 65/30 |
| 4,191,547 | 3/1980 | Wu | 65/30 |
| 4,304,584 | 12/1981 | Borrelli et al. | 65/30.11 |
| 4,479,819 | 10/1984 | Borrelli et al. | 65/30.11 |
| 4,832,724 | 5/1989 | Borrelli et al. | 65/30.11 |
| 4,840,655 | 6/1989 | Borrelli et al. | 65/30.11 |
| 4,908,054 | 3/1990 | Jones et al. | 65/30.11 |
| 5,517,356 | 5/1996 | Araujo et al. | 359/490 |
| 6,058,738 | * 5/2000 | Gill et al. | 65/30.1 |
| 6,089,042 | * 7/2000 | Gill et al. | 65/30.1 |

FOREIGN PATENT DOCUMENTS 4-279337    9/1992   (JP) .

* cited by examiner

Primary Examiner—James Derrington
(74) Attorney, Agent, or Firm—Milton M Peterson

(57) ABSTRACT

Method is disclosed for making glass having both polarizing and non-polarizing regions integral thereto by either ion-exchange or by exposure to light and heat. The polarizing regions of the resulting glass is effective in polarizing light radiation, that is, the glass exhibits permanent dichroic behavior and has at least some polarizing effect in the wavelength range of 400 to 700 nm. The base glass composition contains Cu, Ag and at least one halide such that the resulting precipitated crystal phase consists of a halide.

11 Claims, 4 Drawing Sheets

METHOD OF MAKING GLASS HAVING POLARIZING AND NON-POLARIZING REGIONS

This application claims the benefit of U.S. Provisional Application No. 60/044,790 filed Apr. 24, 1997 and PCT Application No. PCT/US98/07570 filed Apr. 16, 1998.

BACKGROUND OF THE INVENTION

Several methods are known for making polarizing glasses. For example, it has been demonstrated that polarizing glasses can be produced from silver halide-containing glasses by a redraw process as disclosed in U.S. Pat. No. 3,540,793 (Araujo et al.), or by subjecting stretched glass to a reducing gas atmosphere as disclosed in U.S. Pat. Nos. 4,304,584 and 4,479,819 (Borrelli et al.). In the redraw process glass containing a separable phase is stretched or redrawn above its softening temperature, during which process, the separable phase is elongated. The thermal treatment which leads to the phase separation is carried out before the redraw process. In one version of the above process the separated phase is initially spectrally non-absorbing material such as AgClBr, CuClBr or copper/cadmium halides, which must be subsequently modified to create a desired dichroic property necessary for the polarizing effect. This is accomplished by treating the stretched glass in a reducing gas (e.g. hydrogen) environment at elevated temperatures for sufficient time to effect the chemical reduction of the spectrally non-absorbing materials to their corresponding metal. The chemical reduction process is a combined process involving both the diffusion of hydrogen in the glass, and the chemical reaction of the hydrogen with the halide phase. The polarizing behaviors derives from the reduced layer. Also, when the polarizing glass is heated to the vicinity of 500° C. for any prolonged period of time, the elongated particles resphetoidize and the polarizing property is lost. That is, the elongated particle returns to its spherical shape. This is explained by the fact that once the glass is soft enough, the interfacial forces act to undo what the redrawing forces had accomplished.

Hydrogen firing at elevated temperatures to change the color of glasses whose compositions contain reducible ions is also well known. A notable commercial application of that technique is found in the Corning incorporated eyewear product lines marketed under the SERENGETI® and CPF® trademarks. The color changes induced are attributed to the reduction of a portion of the silver in the glass to the atomic state. The chemical reaction proceeds very fast relative to the hydrogen diffusion which leads to the condition of a sharp boundary between the reduced region near the surface, and the unreduced region below the surface.

In addition to silver halide-containing glasses, it has also been shown that copper and cadmium halide photochromic glasses disclosed in U.S. Pat. No. 3,325,299 can also be rendered polarizing in the darkened state. The thermally softened and stretched, or otherwise elongated. This action elongates the halide crystals and is described in detail in U.S. Pat. No. 3,954,485 (Seward III, et al.).

Japanese Published Application S.N. 4-279,337 discloses glasses that may be a silicate, a borate, or a borosilicate, and that may have copper halide crystals formed within the glass. The application further discloses that such glasses may be rendered polarizing in the infra-red for telecommunication purposes. This is accomplished in the same manner as in the silver halide crystal-containing glasses noted above. That is, the glass is stretched to elongate the crystals, and fired in hydrogen to at least partially reduce the copper halide to metallic copper.

U.S. Pat. No. 5,517,356 (Araujo et al.) discloses a glass polarizer having a precipitated crystal phase selected from cuprous, cadmium and mixed cuprous-cadmium halide.

For certain applications it is desirable to have the polarizing properties restricted to localized regions of the glass. There continues to be a need for new and improved methods of forming such integral polarizing/non-polarizing glasses.

Accordingly, the present invention also discloses a method of forming polarizing glasses having integral non-polarizing regions.

SUMMARY OF THE INVENTION

Briefly, the invention relates to a method for producing glass having both polarizing and non-polarizing regions integral thereto by: a) providing a phase separable, copper and silver-containing glass, said glass being phase separable by virtue of the presence therein of silver-halide particles; b) elongating the glass under stress such that the particles are elongated and aligned in the direction of the stress; c) forming a pattern of protected and unprotected regions in the glass, for example, by applying a layer of material on certain regions of the glass; d) either: (i) subjecting the glass to an ion-exchange bath to effect at least a partial reduction of the silver-halide particles and thereby render the glass polarizing in the unprotected regions; or (ii) exposing the glass to ultraviolet light and heat to render glass in the exposed regions polarizing by effecting at least a partial reduction of the silver-halide particles by copper; and e) removing the material from the protected regions to reveal the underlying non-polarizing glass.

As used herein, the "inventive glass" refers to glass having both polarizing and non-polarizing regions integral thereto, wherein the polarizing regions are formed by either ion-exchange or by light exposure at elevated temperatures.

BRIEF DESCRIPTION OF THE DRAWINGS

FIG. 1a is a graph of contrast v. wavelength, while

FIG. 2a is a graph of contrast v. wavelength, while

FIG. 3a is a graph of contrast v. wavelength, while

DETAILED DESCRIPTION OF THE INVENTION

Figure 1A:
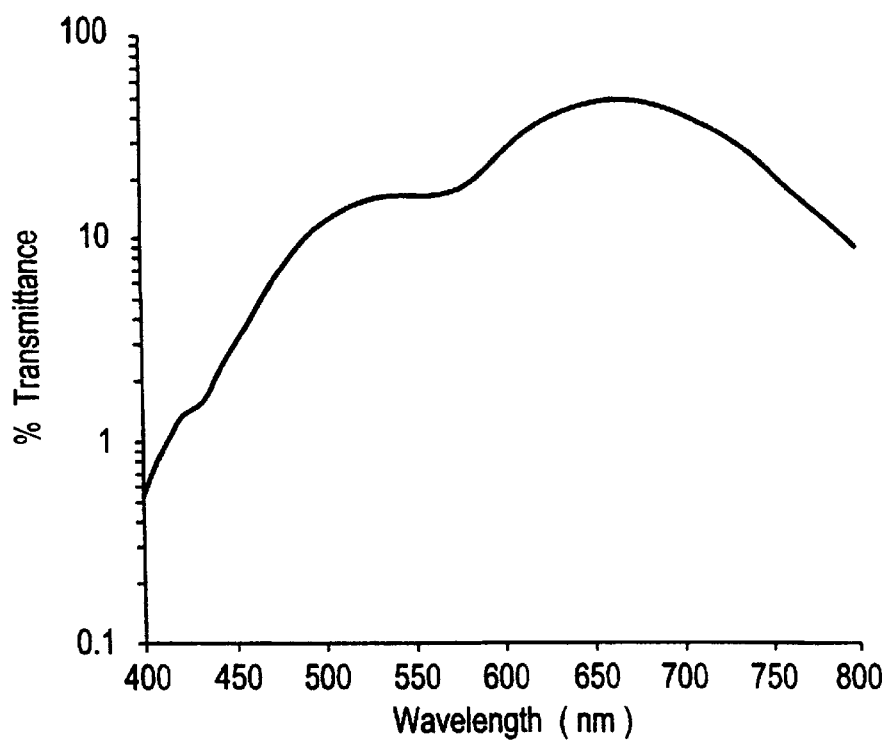

It has been hypothesized that for photochromic polarizing glasses containing silver halide particles, the polarizing property may be due to the anisotropy afforded by the elongated silver halide particles and the adsorption of silver metal particles produced on the surface of the silver halide by the impingement of actinic radiation, commonly ultraviolet radiation. The magnitude of the dichroic ratio, defined as the ratio of the absorption coefficient parallel to the direction of elongation divided by the absorption perpendicular to the direction of elongation in the ultraviolet darkened state, has commonly been measured to be of the order of from 2 to 3.

We have observed that silver-containing glasses having a separable phase, in particular photochromic glasses, by virtue of the presence of silver halide particles therein, viz particles of AgClBr, AgBr or AgCl, copper halide particles, viz, CuClBr, CuCl or CuBr, and/or Cu-Cd halides, can be made to exhibit polarizing behavior. According to the present method, the glass is first stretched or elongated under stress such that the silver halide particles are elongated and aligned in the direction of the stress. Then, the stretched glass having said elongated particles is either subjected to an ion-exchange bath, or exposed to ultraviolet light and heat, to effect a reduction of the silver-halide particles and thereby render the glass polarizing.

Non-limiting examples of useful Ag-halide-containing compositions for the present invention can be found in U.S Pat. Nos. 3,208,860 (the basic patent in the field of photochromic glass production);U.S Pat. Nos. 3,548,060; 3,957,498; 4,190,451; 4,304,584; and 4,479,819, all herein incorporated by reference. Similarly, nonlimiting examples of useful cuprous and/or cadmium-halide containing compositions are disclosed in U.S. Pat. Nos. 3,325,299; 5,281,562; and 5,517,356 all herein incorporated by reference.

A generally useful glass for the present invention includes base compositions within the alkali metal aluminoborosilicate system described in U.S. Pat. No. 3,208,860, modified to include copper. The base composition contains essentially, by weight %, 4–26 $Al_2O_3$, 4–26 $B_2O_3$, 40–76 $SiO_2$; at least one alkali metal oxide selected from, 2–8 $LiO_2$, 4–15 $Na_2O$, 6–20 $K_2O$, 8–25 $Rb_2O$ and 10–30 $Cs_2O$; at least one halogen in the minimum amount of 0.2 wt. % chlorine, 0.1 Br, and 0.08 iodine; at least 0.2 wt. % silver when the halogen is chlorine, 0.05% when the halogen is bromine, and 0.03% when the halogen is iodine.

For ophthalmic applications, the compositions described in U.S. Pat. No. 4,190,451 are preferred due to the inherent fast fading capability and the relative independence to temperature changes exhibited by such glasses. Expressed in weight percent, the composition of such glasses are essentially, on the oxide basis, 8–20 $R_2O$, where $R_2O$ consists of 0–2.5 $Li_2O$, 0–9 $Na_2O$, 0–17 $K_2O$, and 0–6 $Cs_2O$; 14–23 $B_2O_3$, 5–25 $Al_2O_3$, 0–25 $P_2O_5$, 20–65 $SiO_2$, 0.004–0.02 CuO, 0.15–0.3 Ag, 0.1–0.25 Cl, and 0.1–0.2 Br.

Examples of useful cuprous, cadmium and mixed cuprous-cadmium halide compositions are described in U.S. Pat. No. 5,517,356 which comprises essentially in weight % based on the oxides, 40–80 $SiO_2$, 4–35 $B_2O_3$, 0–26 $Al_2O_3$, 0–8 $Li_2O$, 0–15 $Na_2O$, 0–20 $K_2O$, 2–20 ($Li_2O+Na_2O+K_2O$), 0–10 CaO/BaO/SrO, 0.2–2 $Cu_2O$, 0–2 CdO, 0–12 $ZrO_2$, 0–2.5 $SnO_2$, 0–2 $As_2O_3+Sb_2O_3$, 0–2 Cl, 0–2 Br, 0.25–2.0 Cl+Br, and 0–2 F, and ($M_2O+2MO-Al_2O_3--ZrO_2$)/$B_2O_3$ is in the range of 0.15–0.45, where $M_2O$ designates alkali metal oxides and MO represents alkaline earth metal oxides.

The glass batch can be formulated using standard glassmaking materials including sand, alumina, oxides, carbonates and halides. The batch is ballmilled to ensure homogeneity, and melted in a covered crucible. A bar cast from the melt can then be subjected to heat treatment to form the requisite separable crystal phase. After formation of the crystal phase, the bar is then heated to a temperature such that the glass viscosity is in the range of $10^{-8}$ to $10^{-10}$ poises and stretched under stress at that temperature to elongate and align the particles in the direction of the stress.

The present methods can be used to produce glass having a pattern of polarizing and non-polarizing glass irrespective of the base composition of the glass provided the glass contains copper, silver and at least one halide That is, provided the stretched glass contains copper, AgCl and/or AgBr whether or not such glass exhibits photochromic properties. Preferably, the amount of copper in such glass is in the range of 0.05–1%, more preferably in the range of 0.2–0.3%.

We have demonstrated that glass having polarizing and non-polarizing regions can be formed by providing a phase-separable copper and silver-containing glass, said glass being phase separable by virtue of the formation and presence therein of silver-halide particles; elongating the glass under stress such that the particles are elongated and aligned in the direction of the stress; forming a pattern of protected and unprotected regions in the glass, for example, by applying a layer of material on certain regions of the glass; rendering the unprotected regions of the glass polarizing by an ion-exchange process, or by exposing the glass to ultraviolet light and heat; and removing the material from the protected regions to reveal the underlying non-polarizing glass in said region.

As contemplated by the present invention, the polarizing regions of the inventive glass can be formed either by, (i) subjecting the glass to an ion-exchange bath to effect at least a partial reduction of the silver-halide particles and thereby render the glass polarizing in the unprotected regions; or (ii) exposing the glass to ultraviolet light and heat to render glass in the exposed regions polarizing by effecting at least a partial reduction of the silver-halide particles by copper.

According to the first inventive method, after the elongation step, the stretched glass containing elongated silver-halide and copper-halide particles is then patterned and subjected to a molten silver ion-containing bath, e.g., silver-containing nitrates such as $AgNO_3/NaNO_3$, $AgNO_3/KNO_3$, and sulphates, at temperatures in the range of 250–450° C. to effect at least a partial reduction of the silver by copper. The mechanism for the reduction of the silver by ion-exchange is as follows:

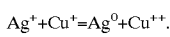

$$Ag^+ + Cu^+ = Ag^0 + Cu^{++}.$$

According to the second inventive method, after the elongation step, the stretched glass containing elongated silver-halide and copper-halide particles is then patterned and exposed to ultraviolet light (about 1000 watts Xe-arc) while being heated to a temperature of about 350° C., to effect at least a partial reduction of the silver by copper and thereby render the exposed glass polarizing. The mechanism for the reduction of the silver by light exposure is as follows:

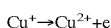

$$Cu^+ \rightarrow Cu^{2+} + e$$

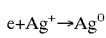

$$e + Ag^+ \rightarrow Ag^0$$

Heat can be applied to the glass during exposure using any appropriate mechanism. One practical procedure for achieving this is by a hot plate exposure in which the glass is placed on a hot plate under a 1000 Watt xenon arc lamp for about 2 to 3 hours, to bring the glass to a temperature in the range of 300–400° C.

A non-limiting example of a use full glass composition for this embodiment is the glass disclosed in U.S. Pat. No. 4,130,437, modified to eliminate lead. We have found that while fluorine enhances the hue of the color generated in glass using this method, it is not necessary but may be added in amounts up to 0.25 wt. %. Similarly, chlorine enhances the hue of the glass and may be present in amounts up to 1 wt. %, preferably about 0.5 wt. %. In the absence of bromide, the resulting glass becomes hazy when heat treated. Bromide may be present in amounts up to 1 wt. %, preferably in the range of 0.1–0.3 wt. %. Silver is essential to the present invention since the observed coloration is due to the reduction of silver. However, we have observed that beyond a certain level, no measurable effect is achieved. The amount of silver can be up to 1 wt. %, preferably in the range of 0.1–0.5 wt. %, more preferably about 0.2 wt. %. Copper in an amount of about 0.1 wt. % was found to be optimal for this embodiment. One example of a particularly useful base glass composition for this embodiment, is, in wt. % based on the oxides: 60.4 $SiO_2$, 17.7 $B_2O_3$, 11.8 $Al_2O_3$, 2.1 $Li_2O$, 5.9 $Na_2O$, and 1.6 $K_2O$, to which was added, 0–0.25% F, 0–1.0% Cl, 0–0.4% Br, and 0–0.5% CuO. While the compositional limits discussed in this paragraph are particularly adapted for the second inventive method (light exposure), these ranges can also useful for the ion-exchange method.

Patterning of the stretched glass involves forming a pattern of protected and unprotected regions on the glass. Such patterning can be achieved by any known method. For example, a pattern can be formed by applying a layer of protective material on certain regions of the glass. For the ion-exchange method, the protective material is any material which is capable of retarding ionic motion of Ag into the glass. For the light exposure method, any material which is capable of blocking ultraviolet light can be used.

Figure 1B:
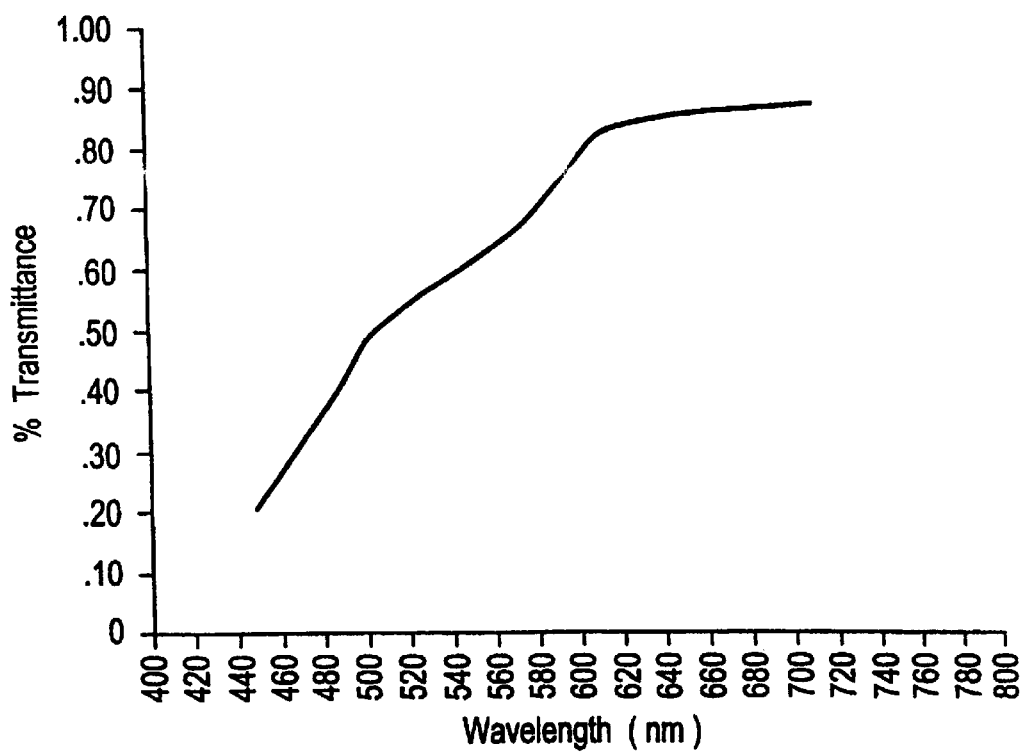
FIG. 1b is a graph of transmittance v. wavelength, for conventional polarizing glass made by hydrogen treatment.
Figure 2A:
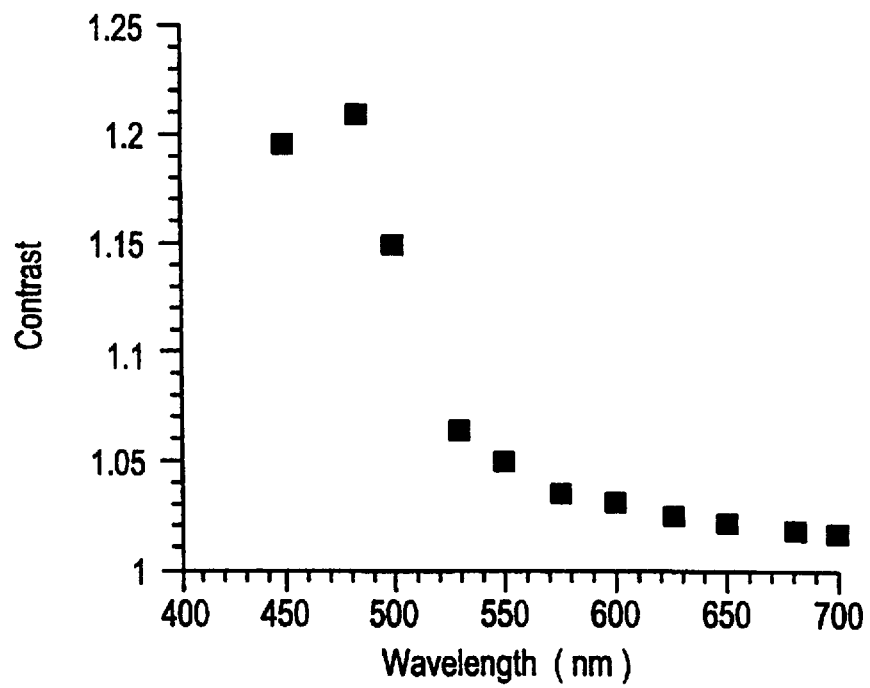
Figure 2B:
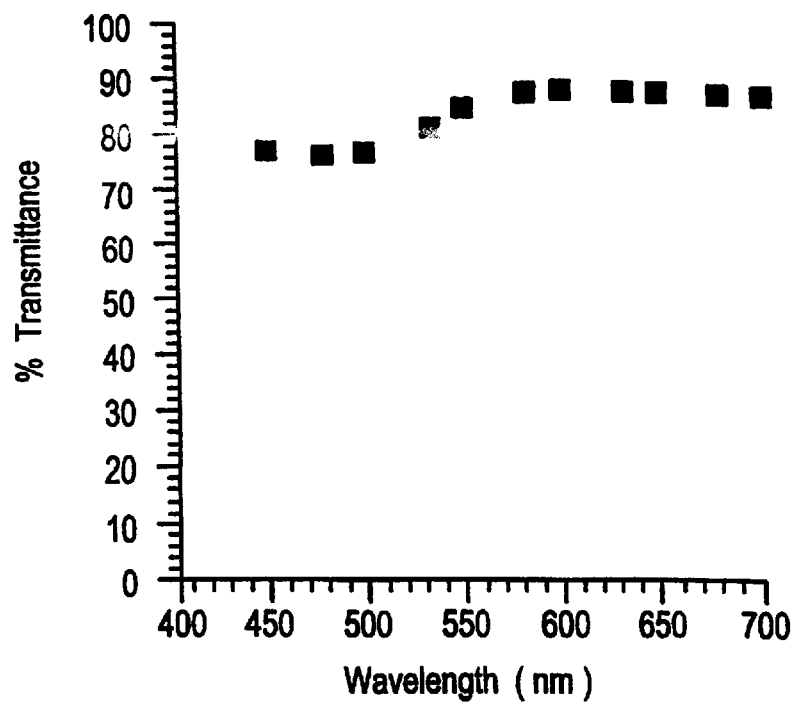
FIG. 2b is a graph of transmittance v. wavelength, for polarizing glass made by the inventive ion-exchange method.
Figure 3A:
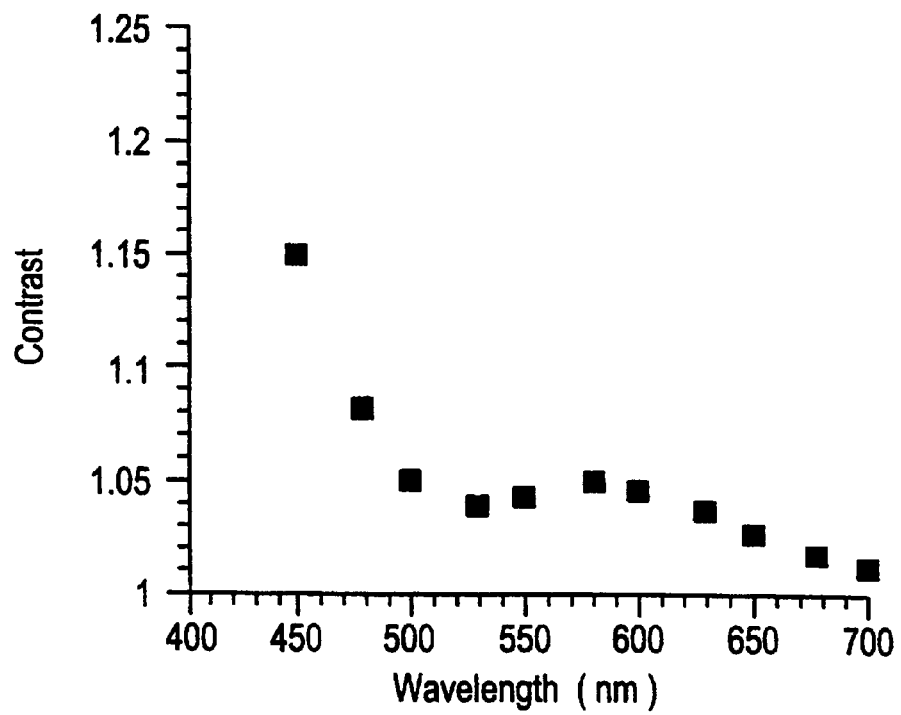
Figure 3B:
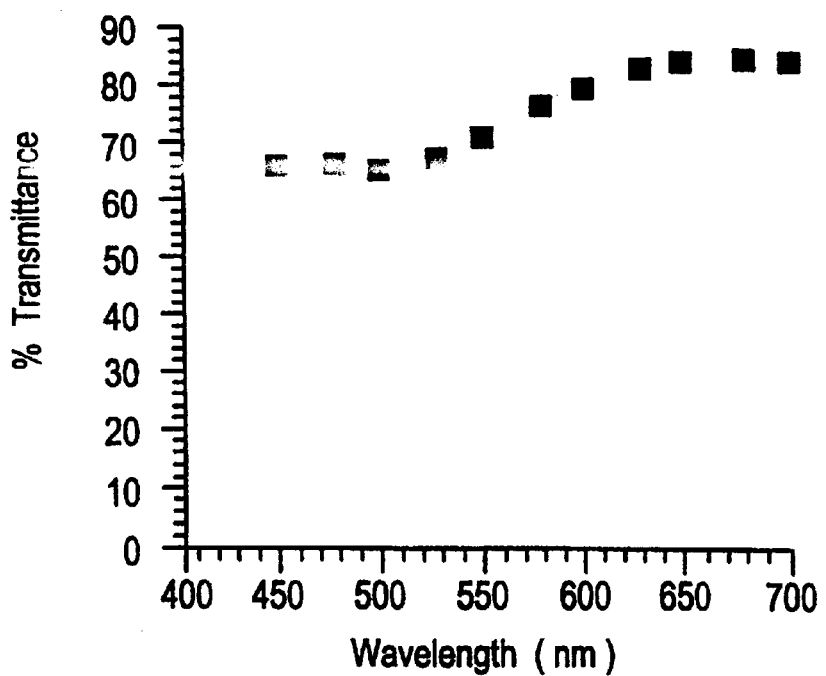
FIG. 3b is a graph of transmittance v. wavelength, for polarizing glass made by the inventive light exposure method.

FIGS. 1 to 3 are graphs giving the contrast v. wavelength, and transmittance v. wavelength for (i) a hydrogen-treated glass (FIGS. 1a and 1b), (ii) an ion-exchanged glass (FIGS. 2a and 2b), and (iii) a light exposed glass (FIGS. 3a and 3b).

Figure 4:
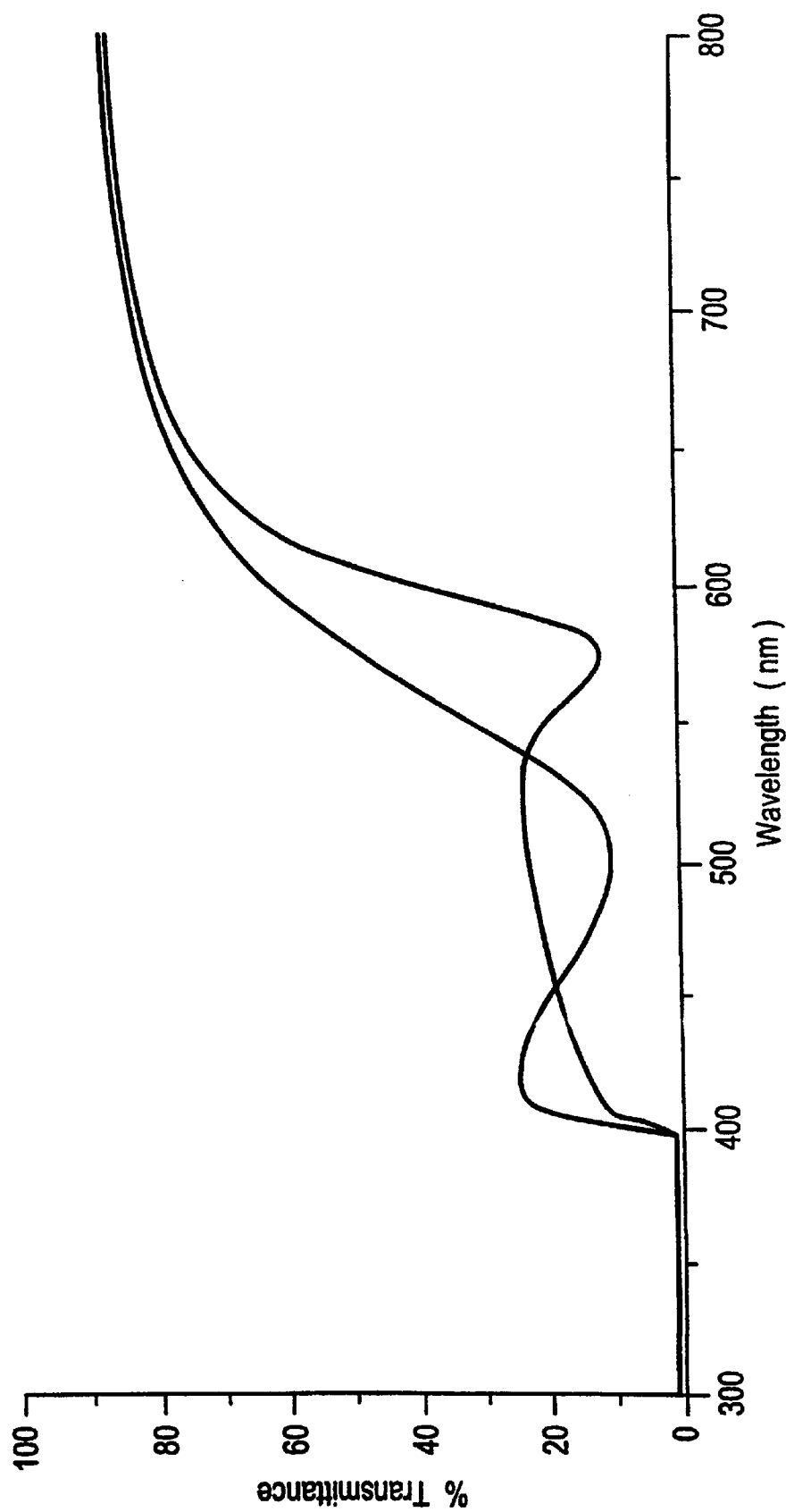
FIG. 4 is a graph comparing the induced average absorption of a polarizing glass formed by hydrogen treatment, against a glass polarized by ion-exchange.

FIG. 4 is a graph comparing the induced average absorption (defined as $\{_{par}+_{perpen}\}/2$), for a stretched CuClBr glass rendered polarizing by hydrogen treatment (line B), against a glass rendered polarizing by ion-exchange (line A). The hydrogen treatment was carried out at a temperature of about 385° C. for 3 hours, while the ion-exchange treatment was carried out in a 1 mole % silver-ion containing bath at 400° C., for 16 hours. CuClBr glass was used in both cases. The glass of line A was subjected to a silver ion-containing bath (1 mole % $AgNO_3$/99 mole % $KNO_3$), at 400° C., for 16 hours. The glass of line B was subjected to a hydrogen environment at 400° C., for 1 hour. Without intending to be bound by theory, we believe that the observed shift in the induced absorption curves seen in this figure is due to the fact that in the hydrogen treatment method, the silver reduction is complete, while only partial reduction of silver is achieved in the ion-exchange method. We have observed that there is an optimum level of silver reduction achieved and that this level is not increased by such variables as the amount of silver, bath temperature, or amount of copper present in the batch.

We have found that in the ion-exchange method the efficiency of the polarizing process depends on the bath temperature. For example, in one experiment, glass subjected to a 1 mole % $AgNO_3$/99 mole % $KNO_3$ bath at 400° C. for 16 hours exhibited a polarized layer of about 65 μm depth, while similar treatment at 360° C. resulted in a depth of only about 45 μm.

To produce glass having a pattern of polarizing and non-polarizing regions integral to the glass by the ion-exchange method, after stretching the glass, suitable protective material is selectively applied to regions of the glass which are not to be rendered polarizing, in order to protect such regions from the ion-exchange bath and thereby form a pattern of protected and unprotected regions on the glass. The glass is then subjected to the salt bath as described above to render polarizing the unprotected regions of the glass. Afterwards, the material is removed from the protected regions to reveal a glass having a pattern of polarizing and non-polarizing regions. Since silver reacts rapidly in this ion-exchange environment, it is desirable to control the amount of silver in the bath as too high a level may lead to excessive precipitation of the silver. On the other hand, if the amount of silver in the bath is too low, the reaction may require an excessive amount of time to reduce the silver. We have found that bath containing 0.1–5 mole percent $Ag/NO_3$, and 95–99.9 mole % $KNO_3$ can be used for the inventive method, preferably, 0.5–2 mole % $Ag/NO_3$, and more preferably, about 1 mole % $Ag/NO_3$.

Any material which is capable of retarding ionic motion of the silver into the glass to thereby prevent the polarization of the glass may be used as the protective material provided such material is sufficiently resistant to the corrosive nature of the ion-exchange bath. Non-limiting examples of suitable protective materials include Si, Ti and to a less extent, Cr.

The protective material may be applied by any suitable method such as by sputtering, thermal evaporation, chemical vapor deposition, spraying etc. The thickness of the material is not particularly crucial but will be determined by the practical limitations of the particular method by which the material is applied. For example, if the material is applied by sputtering, the thickness will be in the range of 0.1 to 5 μm. As described in that application, one method of forming a pattern of protective material over glass which may be applicable to the present inventive method is to apply the material through a shadow mask having the desired pattern.

To produce glass having a pattern of polarizing and non-polarizing regions by the light exposure method, after stretching a copper and silver-containing glass to form phase-separable elongated silver-halide particles, a shadow mask having the desired pattern of holes is placed on the glass. The glass is then exposed to ultraviolet light while being heated to about 350° C. such that light contacts the glass through the holes in the mask to partially reduce the silver and thereby render the glass in the exposed regions polarizing. We have found that for this method, the Cu concentration can be as low as 0.05 weight % in order to obtain any significant contrast The contrast also depends on the duration of the UV exposure as well as the temperature at which the exposure occurs.

The essential character of this invention can easily be ascertained from the foregoing by one skilled in the art, and such person can make various changes and modifications to the invention without departing from the intended spirit and scope.

What is claimed is:

1. A method of making glass having polarizing and non-polarizing regions integral thereto, by:
   (a) providing a phase-separable, copper and silver-containing glass, said glass being phase-separable by virtue of the presence therein of silver-halide particles;
   (b) elongating the glass under stress such that the particles are elongated and aligned in the direction of the stress;
   (c) forming a pattern on the glass surface in which an area, or areas, are protected against reduction of silver halide, and the remaining area(s) are left unprotected; and
   (d) either (i) subjecting the unprotected region of the glass to an ion exchange bath, or (ii) exposing the unprotected region of the glass to ultraviolet light and heat, to effect a partial reduction of the silver-halide particles and thereby render the glass in said unprotected region polarizing.

2. The method of claim 1 wherein the ion-exchange bath is a molten bath containing silver ions.

3. The method of claim 2, wherein the molten bath comprises nitrates and sulphates.

4. The method of claim 1, wherein said phase separable glass comprises a reducible elongated phase selected from the group consisting of $AgCl_xBr_{1-x}$, $CuCl_xBr_{1-x}$, where x has a value between 0 and 1, and Cu/Cd halides.

5. A method of forming glass having polarizing and non-polarizing regions integral thereto, by:
  a) providing a phase-separable, copper and silver-containing glass, said glass being phase separable by virtue of the presence therein of silver-halide particles;
  b) elongating the glass under stress such that the particles are elongated and aligned in the direction of the stress;
  c) forming a pattern of protected and unprotected regions in the glass by applying a layer of material on the regions of the glass to be protected, said material being capable of retarding ionic motion of Ag into the glass;
  d) subjecting the glass to a molten ion-exchange bath containing silver to effect a reduction of the silver-halide particles to silver and thereby render the glass polarizing in the unprotected regions; and
  e) removing the material from the protected regions to reveal the underlying non-polarizing glass.

6. The method of claim 4, wherein the phase-separable glass comprises a reducible elongated phase selected from the group consisting of $AgCl_xBr_{1-x}$, $CuCl_xBr_{1-x}$, where x has a value between 0 and 1, and Cu/Cd halides.

7. The method of claim 5, wherein the layer of material is selected from the group consisting of Ti and Si.

8. The method of claim 7, wherein the layer of material is formed by a method selected from the group consisting of sputtering, thermal evaporation, and chemical vapor deposition.

9. The method of claim 8, wherein the layer of material has a thickness in the range of 0.01 to 5 $\mu$m.

10. The method of claim 5, wherein the glass is subjected to the ion-exchange bath at a temperature in the range of 250 to 450° C.

11. A method of forming glass having polarizing and non-polarizing regions integral thereto, by:
  a) providing a phase-separable, copper and silver-containing glass, said glass being phase separable by virtue of the presence therein of silver-halide particles;
  b) elongating the glass under stress such that the particles are elongated and aligned in the direction of the stress;
  c) forming a pattern of protected and unprotected regions in the glass by placing a shadow mask having the desired pattern formed by holes in the mask;
  d) exposing the unprotected regions of the glass to ultraviolet light and heat through said holes to effect a reduction of the silver-halide particles to silver and thereby render the glass polarizing in the unprotected regions.

* * * * *

UNITED STATES PATENT AND TRADEMARK OFFICE
CERTIFICATE OF CORRECTION

PATENT NO. : 6,298,691 B1
DATED : October 9, 2001
INVENTOR(S) : Borrelli et al.

Page 1 of 1

It is certified that error appears in the above-identified patent and that said Letters Patent is hereby corrected as shown below:

<u>Column 7,</u>
Line 5, "$AgCl_x,Br_{1-x}$," should read -- $AgCl_xBr_{1-x}$, --.

Signed and Sealed this

Thirtieth Day of April, 2002

*Attest:*

JAMES E. ROGAN
*Director of the United States Patent and Trademark Office*

*Attesting Officer*